US008457156B2

(12) United States Patent
Chapman et al.

(10) Patent No.: US 8,457,156 B2
(45) Date of Patent: *Jun. 4, 2013

(54) WIDEBAND CABLE SYSTEM

(75) Inventors: John T. Chapman, Saratoga, CA (US);
Alvar A. Dean, Groton, MA (US);
Richard J. Santarpio, Hudson, MA (US); John P. Prokopik, Auburn, NH (US); Michael J. Healy, Berlin, MA (US)

(73) Assignee: Cisco Technology, Inc., San Jose, CA (US)

( * ) Notice: Subject to any disclaimer, the term of this patent is extended or adjusted under 35 U.S.C. 154(b) by 333 days.

This patent is subject to a terminal disclaimer.

(21) Appl. No.: 12/854,009

(22) Filed: Aug. 10, 2010

(65) Prior Publication Data

US 2011/0051753 A1   Mar. 3, 2011

Related U.S. Application Data

(62) Division of application No. 10/358,416, filed on Feb. 4, 2003, now Pat. No. 7,782,898.

(51) Int. Cl.
*H04J 3/16* (2006.01)
*H04J 3/24* (2006.01)
*H04J 3/06* (2006.01)

(52) U.S. Cl.
USPC ............ 370/468; 370/474; 370/503; 370/537

(58) Field of Classification Search
USPC ................. 370/235, 238, 241, 252, 358, 389,
370/468, 518, 474, 503, 537; 375/238, 240;
709/238; 725/95, 119
See application file for complete search history.

(56) References Cited

U.S. PATENT DOCUMENTS

| 5,592,480 | A | 1/1997 | Carney et al. |
| 5,918,019 | A | 6/1999 | Valencia |
| 5,982,748 | A | 11/1999 | Yin et al. |
| 6,137,793 | A | 10/2000 | Gorman et al. |
| 6,229,790 | B1 | 5/2001 | Butrym et al. |
| 6,434,141 | B1 | 8/2002 | Oz et al. |
| 6,819,682 | B1 | 11/2004 | Rabenko et al. |
| 6,842,429 | B1 * | 1/2005 | Shridhar et al. ............. 370/252 |
| 6,993,353 | B2 | 1/2006 | Desai et al. |
| 7,065,779 | B1 | 6/2006 | Crocker et al. |
| 7,113,484 | B1 | 9/2006 | Chapman et al. |
| 7,126,920 | B2 * | 10/2006 | Venkatesulu et al. ......... 370/241 |
| 7,139,923 | B1 | 11/2006 | Chapman et al. |

(Continued)

FOREIGN PATENT DOCUMENTS

WO    00/72509 A2    11/2000

OTHER PUBLICATIONS

Mohanty et al., "Max-min Utility Fairness in Link Aggregated Systems", High Performance Switching and routing, 2007, HPSR '07, Workshop on, IEEE, PI: May 1, 2007, pp. 1-7.

(Continued)

*Primary Examiner* — Michael Thier
*Assistant Examiner* — Awet Haile
(74) *Attorney, Agent, or Firm* — Leon R. Turkevich

(57) ABSTRACT

A wideband cable modem system increases available bandwidth of a single channel by encoding a data stream into wideband packets. The wideband packets are associated with a logical wideband channel that extends over multiple physical downstream cable channels.

20 Claims, 13 Drawing Sheets

U.S. PATENT DOCUMENTS

| | | | |
|---|---|---|---|
| 7,184,433 B1* | 2/2007 | Oz | 370/389 |
| 7,218,901 B1 | 5/2007 | Mobley | |
| 7,274,679 B2 | 9/2007 | Amit et al. | |
| 7,292,578 B1 | 11/2007 | Kerr et al. | |
| 7,349,430 B1 | 3/2008 | Chapman et al. | |
| 7,562,168 B1 | 7/2009 | Yifrach et al. | |
| 7,782,898 B2 | 8/2010 | Chapman et al. | |
| 8,160,098 B1 | 4/2012 | Yan et al. | |
| 2002/0052927 A1 | 5/2002 | Park | |
| 2002/0093955 A1 | 7/2002 | Grand et al. | |
| 2002/0106017 A1 | 8/2002 | Dombkowski et al. | |
| 2002/0131403 A1 | 9/2002 | Desai et al. | |
| 2002/0131426 A1 | 9/2002 | Amit et al. | |
| 2002/0133618 A1 | 9/2002 | Desai et al. | |
| 2002/0136203 A1 | 9/2002 | Liva et al. | |
| 2002/0141585 A1 | 10/2002 | Carr | |
| 2002/0154655 A1 | 10/2002 | Gummalla et al. | |
| 2002/0191691 A1 | 12/2002 | Holborow | |
| 2003/0002540 A1* | 1/2003 | Eerenberg et al. | 370/518 |
| 2003/0009765 A1* | 1/2003 | Linden et al. | 725/95 |
| 2003/0212999 A1* | 11/2003 | Cai | 725/119 |
| 2004/0161098 A1 | 8/2004 | Suzuki et al. | |
| 2004/0163129 A1 | 8/2004 | Chapman et al. | |
| 2004/0244043 A1 | 12/2004 | Lind et al. | |
| 2005/0122966 A1 | 6/2005 | Bowes | |
| 2005/0232304 A1 | 10/2005 | Quigley | |
| 2005/0265376 A1 | 12/2005 | Chapman et al. | |
| 2005/0265392 A1 | 12/2005 | Chapman et al. | |
| 2005/0265397 A1 | 12/2005 | Chapman et al. | |
| 2006/0039380 A1 | 2/2006 | Cloonan et al. | |
| 2006/0168612 A1 | 7/2006 | Chapman et al. | |
| 2007/0049216 A1 | 3/2007 | Karaoguz | |
| 2007/0053321 A1 | 3/2007 | Beales | |
| 2007/0097907 A1 | 5/2007 | Cumming | |
| 2007/0098007 A1 | 5/2007 | Prodan et al. | |
| 2007/0171905 A1 | 7/2007 | Dai | |
| 2008/0095083 A1 | 4/2008 | Sorenson et al. | |
| 2010/0169475 A1 | 7/2010 | Woundy et al. | |
| 2010/0226390 A1 | 9/2010 | Yan et al. | |
| 2010/0316104 A1 | 12/2010 | Chapman et al. | |

OTHER PUBLICATIONS

European Patent Office; International Search Report and Written Opinion for PCT/US2010/026543; Aug. 3, 2010.
Cablelabs, Data-Over-Cable Service Interface Specifications DOCSIS 3.0 Security Specification, c. 2006-2007, Cable Television Laboratories, Inc., http://www.cablemodem.com/specifications/specifications30.html, Aug. 3, 2007.
Stolowitz Ford Cowger LLP, Listing of Related Cases, Jun. 21, 2011.
Bhavesh N. Desai et al., "FastChannel: A Higher-Speed Cable Data Service", AT&T Labs Research, 26 pages, Jan. 2002.
Postel, J., "User Datagram Protocol", RFC 768, Aug. 28, 1980, 3 pgs.
Postel, Jon, Editor, "DARPA Internet Program Protocol Specification", RFC 791, Sep. 1981, 45 pages.
Deering, S., "Host Extensions for IP Multicasting", RFC 1112, Aug. 1989, 16 pages.
Droms, R., "Dynamic Host Configuration Protocol", RFC 2131, Mar. 1997, 45 pages.
Townsley, W., et al., "Layer Two Tunneling Protocol "L2TP"", RFC 2661, Aug. 1999, 80 pages.
Cable Television Laboratories, Inc., "Data-Over-Cable Service Interface Specifications DOCSIS 2.0, Radio Frequency Specification", SP-RFIv2.0-I04-030730, 1999-2003, 512 pages.
Cable Television Laboratories, Inc., "Data-Over-Cable Service Interface Specifications DOCSIS 2.0, Radio Frequency Interface Specification", CM-SP-RFIv2.0-I08-050408, Annex C, pp. 339-390, Copyright 1999-2005.
Cable Television Laboratories, Inc., "Data-Over-Cable Service Interface Specifications DOCSIS 2.0, Radio Frequency Specification", CM-SP-RFIv2.0-I09-050812, 1999-2005, 534 pages.
Cable Television Laboratories, Inc., "DOCSIS.RTM. Set-top Gateway (DSG) Interface Specification" CM-SP-DSG-I02-040804, Copyright 2001-2004.
Cable Television Laboratories, Inc., "DOCSIS.RTM. Set-top Gateway (DSG) Interface Specification" CM-SP-DSG-I04-050408, Copyright 2001-2005.
Bhattacharyya, et al., "An Overview of Source-Specific Multicast (SSM)", RFC 3569, Jul. 2003, 14 pages.
Droms, R., et al., "Dynamic Host Configuration Protocol for IPv6 (DHCPv6)", RFC 3315, Jul. 2003, 100 pages.
Droms, R., "Stateless Dynamic Host Configuration Protocol (DHCP) Service for IPv6", RFC 3736, Apr. 2004, 9 pages.
Chapman, John T., "CMTS Remote PHY for a DOCSIS Network: DMPI Over IP Protocol Specification", RP-SP-DoIP-D1-040715B.doc, Cisco Systems, Inc., EDCS-387722, May 26, 2004.
Cisco Systems, Inc., DHCP and the DOCSIS Configuration File for Cable Modems (DOCSIS 1.0), Document ID: 10961, Sep. 16, 2004.
IEEE Standards, "802.16, IEEE Standard for Local and Metropolitan Area Networks, Part 16: Air Interface for Fixed Broadband Wireless Access Systems", IEEE Std. 802.16-2004, Oct. 1, 2004, 893 pages.
Cable Television Laboratories, Inc., "Data-Over-Cable Service Interface Specifications Modular CMTS", CM-SP-DEPI-W03-050302, 49 pgs., Copyright 2005.
Ramakrishnan, Sangeeta, "Next Generation Edge—Realizing the vision of shared resources and bandwidth", SCTE Conference on Emerging Technologies, Jan. 11-13, 2005, 16 pgs.
Chapman, John T., "Remote PHY Technical White Paper Addendum," Downstream External PHY Interface Specification, Cisco Systems, Inc., EDCS-377253, Jan. 24, 2005.
Cisco Systems, Inc., "Downstream External PHY Interface Specification", SP-DEPI-W2-041101A.DOC, EDCS-408926, Jan. 25, 2005.
Lau, J., et al., "Layer Two Tunneling Protocol—Version 3 (L2TPv3)," RFC 3931, Mar. 2005, 94 pages.
Cable Television Laboratories, Inc., "DOCSIS Radio Frequency Interface Specification", CM-SP-RFIv2.0-I10-051209, 538 pgs., Dec. 9, 2005.
Madvinsky, et al., Don't Let Your Modem Be Cloned, Jun. 2000, pp. 1-7, Communications Technology.
Millet, Theft of Service—Inevitable?, Dec. 2005, pp. 1-4, Communications Technology.
ETSI, Data-Over-Cable Systems Part 2 Radio Frequency Interface Specifications, Jan. 2003, pp. 59-66, ES 201 488-2 V1.2.1.
Desai, et al., FastChannel: A Higher-Speed Cable Data Service, AT&T Labs-Research, pp. 1-13, Jan. 2002.
Adoba, et al., Extensible Authentication Protocol (EAP), RFC 3748, Jun. 2004, pp. 1-64, Standards Track.
ITU-T Telecommunication Standardization Sector of ITU, Series J: Cable Networks and Transmission of Television, Sound Programme and Other Multimedia Signals, Interactive Systems for Digital Television Distribution, Recommendation J.122, Dec. 2002, 506 pages, International Telecommunication Union.
Mohanty et al., "Max-min Utility Fairness in Link Aggregated Systems", High Performance Switching and routing, 2007, HPSR '07 Workshop on, IEEE, PI: May 1, 2007, pp. 1-7.
European Patent Office; International Search Report and Written Opinion for PCT/US2010/026453I Aug. 3, 2010; 9 pages.
Cablelabs, Data-Over-Cable Service Interface Specifications DOCSIS 3.0 Security Specification, c. 2006-2007, Cable Television Laboratories, Inc., http://www.cablemodem.com/specifications/specifications30.html, 223 pages.

* cited by examiner

WIDEBAND MPEG-TS PACKET
ORDERING WITHIN A WIDEBAND CHANNEL

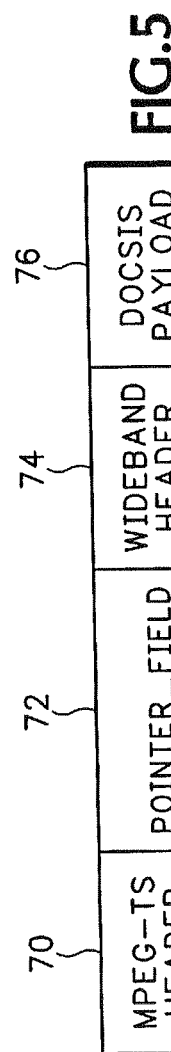
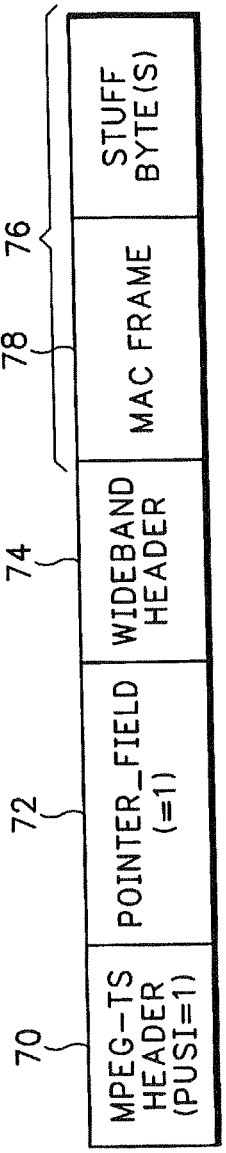
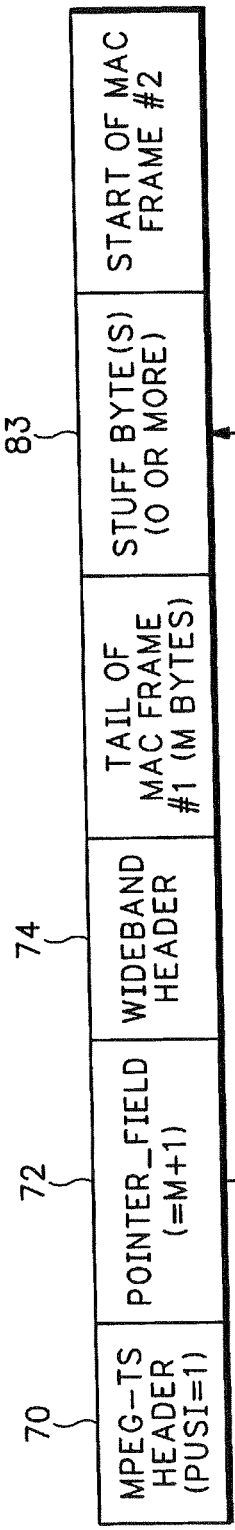

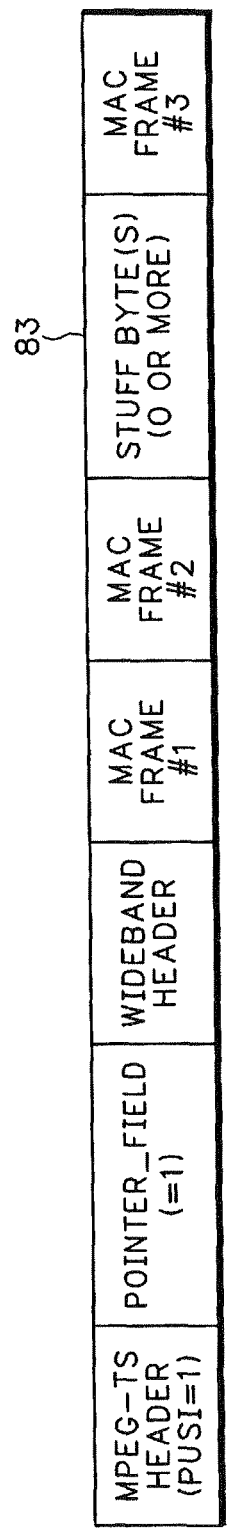
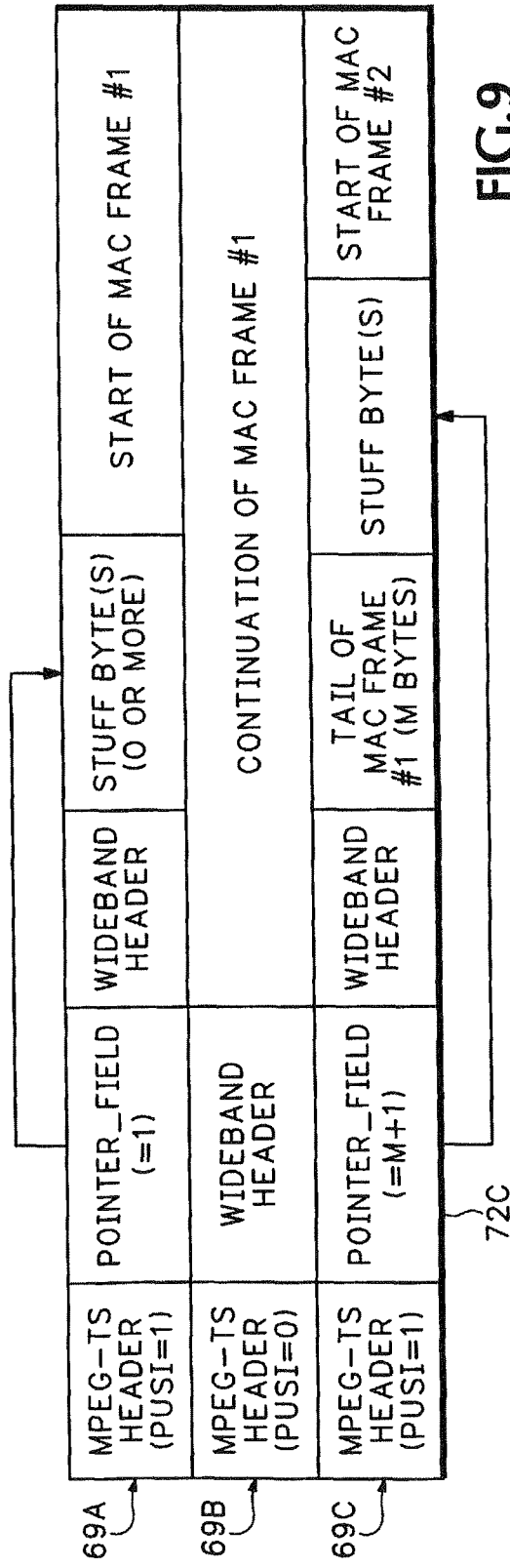

WIDEBAND AND NARROWBAND CHANNEL ASSOCIATIONS

WIDEBAND CABLE SYSTEM

CROSS REFERENCE TO RELATED APPLICATION

This application is a divisional of U.S. patent application Ser. No. 10/358,416 filed Feb. 4, 2003, entitled WIDEBAND CABLE SYSTEM, the disclosure of which is incorporated herein by reference in its entirety.

BACKGROUND

The Data Over Cable Service Interface Specification (DOCSIS) standard defines a high speed, bi-directional, data communication channel between cable providers and cable customers. The DOCSIS standard defines the layer 1 thru layer 3 communication protocols, timings, and Radio Frequency (RF) specifications for data traffic over cable systems. The communication media can be either coaxial cable or fiber.

FIG. 1 shows how Internet Protocol (IP) traffic is currently transferred over a DOCSIS system. A communication link is established between a Cable Modem Termination Systems (CMTS) 14 on the cable provider end and a Cable Modem (CM) 20 on the customer premises. Data transfers from the CMTS 14 to the CM 20 are referred to as downstream while transfers from the CM 20 to the CMTS 14 are referred to as upstream.

The CMTS 14 at a cable system headend may include a Wide Area Network connection 12, such as an Ethernet connection, that receives IP traffic. Other types of network interfaces may also be used such as Dynamic Packet Transport/Resilient Packet Ring (DPT/RPR) or Packet-over-SONET/SDH (POS) The CMTS 14 modulates the IP traffic over a single downstream channel 16 on a high speed Hybrid Fiber Coax (HFC) 19. In one instance, the single downstream channel 16 has a bandwidth limit of about 30 to 42 Million Bits Per Second (Mbps) and may supply downstream IP connectivity for up to 8000 different cable modems 20 connected to the same cable plant 19. Each cable modem 20 demodulates the downstream traffic and formats the traffic for transfer over Ethernet link 22. Upstream IP traffic is transferred over upstream channel 18.

Most cable traffic consists of data flowing in the downstream direction from CMTS 14 to CM 20. Current bandwidth may be sufficient for large numbers of cable modems with bursty traffic that can operate efficiently on shared bandwidth. However, current cable systems cannot support applications that have a high average bandwidth such as Constant Bit Rate (CBR) or Variable Bit Rate (VBR) Video.

The present invention addresses this and other problems associated with the prior art.

SUMMARY OF THE INVENTION

A wideband cable modem system increases available bandwidth of a single channel by encoding a data stream into wideband packets. The wideband packets are associated with a logical wideband channel that extends over multiple downstream physical cable channels.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIGS. 5-9 show different fields in a wideband packet.

DETAILED DESCRIPTION

Figure 2:
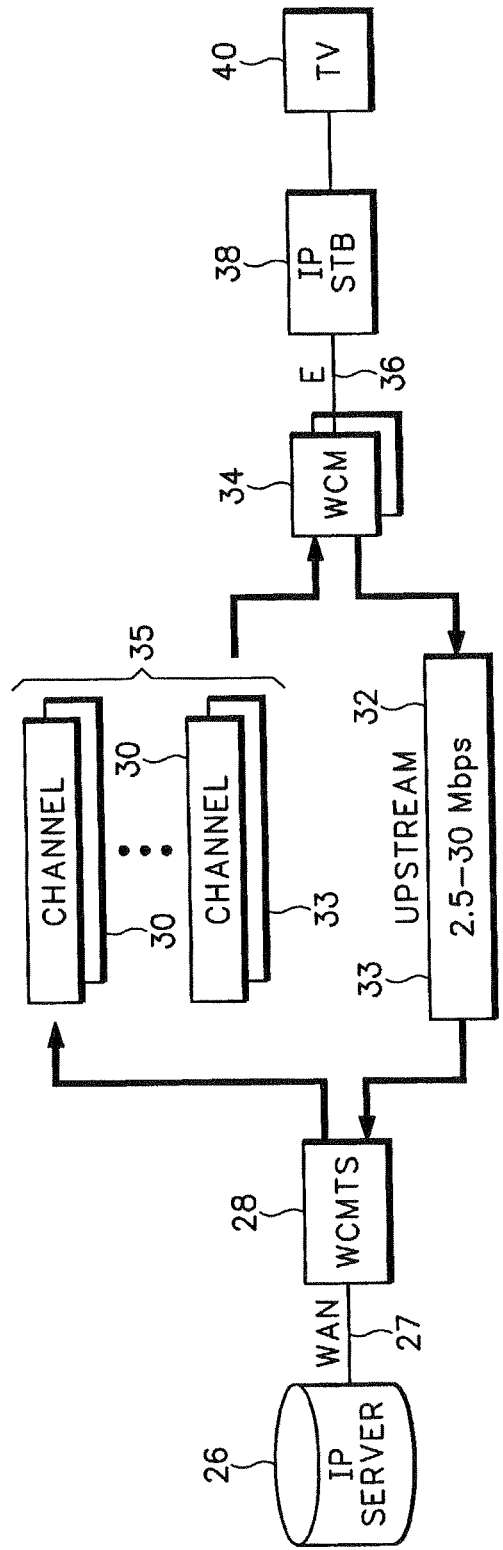
FIG. 2 is a block diagram showing how a wideband cable system uses multiple downstream channels for carrying downstream IP traffic.

Referring to FIG. 2, a group of downstream RF channels 30 in an HFC 33 are bundled together into one wideband channel 35. A single RF channel 30 is defined in the nomenclature of the present invention as a NarrowBand (NB) channel. The wideband channel 35 is a logical channel that spans one or more physical RF channels 30.

An IP server 26 outputs an IP data stream to a Wideband Cable Modem Termination System (WCMTS) 28 over an Ethernet connection 27 or some other type of Wide Area Network (WAN) link. Any type of data can be sent over connection 27, but in one example a video data stream is sent. The WCMTS 28 transmits portions of the data stream over the multiple different downstream RF channels 30.

The wideband channel 35 contains a number of wideband transport sub-channels which can be dynamically adjusted for varying bandwidth requirements. Legacy protocols can be interlaced into the wideband channel maintaining backward compatibility with existing cable modems. The bandwidth of the wideband channel 35 provides scalable and efficient Variable Bit Rate (VBR) utilization of data/voice/video IP streams in a DOCSIS compatible environment.

Figure 1:
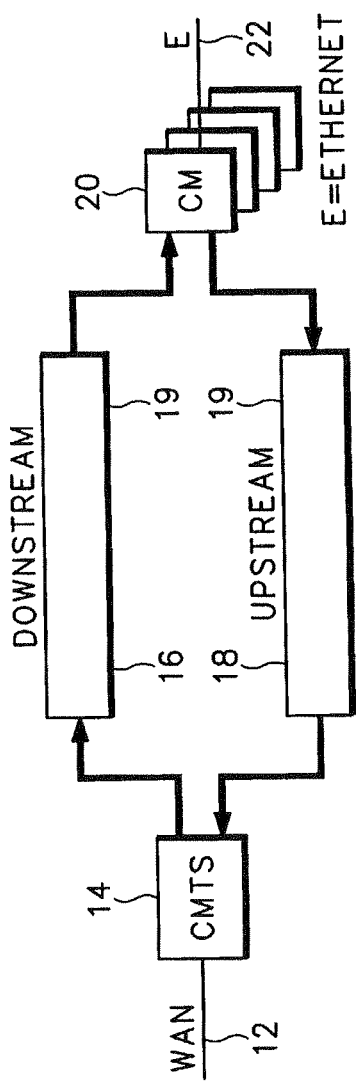
FIG. 1 is a background diagram showing downstream and upstream channel used in a cable plant for transferring IP data.

The individual downstream RF channels 30 are received at one or more Wideband Cable Modems (WCMs) 34 on the HFC plant 33. In one embodiment, the WCMTS 28 also operates as a conventional CMTS 14 (FIG. 1) and the WCMs 34 also operate as conventional CMs 20 as shown in FIG. 1. An upstream channel 32 is used for upstream DOCSIS communications from the WCMs 34 to the WCMTS 28.

The RF channels 30 are independent of each other. All RF channels 30 could originate from a single multi-channel WCMTS 28, but each different RF channels may go to different WCMs 34. Many WCMs 34 can share a single or multiple downstream RF channels 30. Data is transmitted via the RF channels 30 by framing DOCSIS MAC frames into Motion Picture Experts Group—Transport Stream (MPEG-TS) packets.

The WCMs 34 can simultaneously demodulate each of the different channels 30 and regenerate the different portions of the original data stream received on link 27. In one example, the different portions of the data stream distributed over the different downstream RF channels 30 are reformatted back into Ethernet frames and sent over link 36 to an IP Set Top Box (STB) 38. The STB 38 converts the digital data contained in the Ethernet frames into an analog signal for displaying on a television 40.

Figure 3:
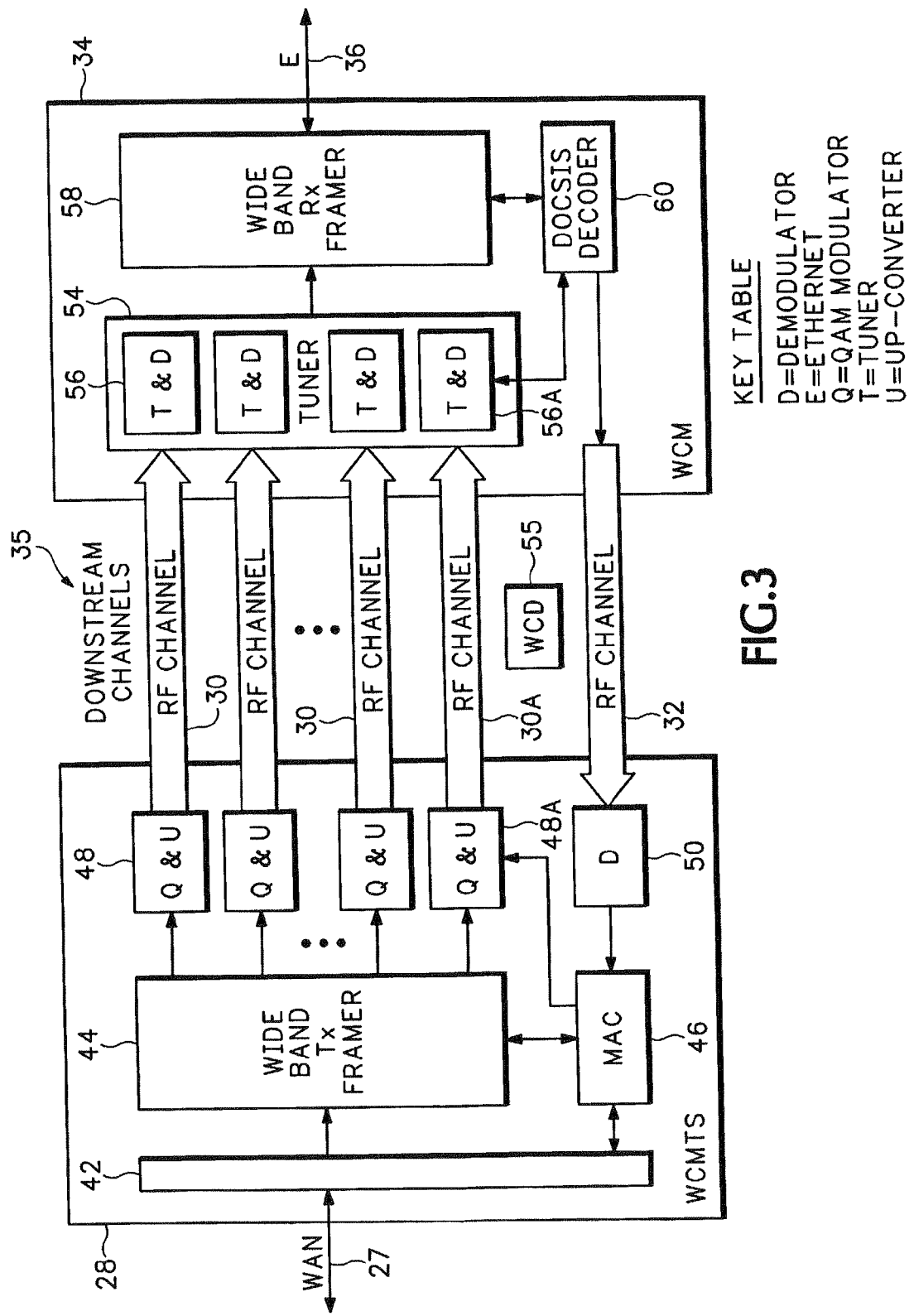
FIG. 3 is a detailed diagram of the circuitry used in a wideband cable system.

FIG. 3 shows the circuitry in the WCMTS 28 and the WCM 34 that encode and decode the wideband channel 35. The WCMTS 28 includes a backplane 42 that couples data from the WAN connection 27 to a wideband transmit framer 44 and a Media Access Control (MAC) interface 46. In one embodiment, the wideband framer 44 separates Ethernet frames into wideband packets that are transmitted simultaneously over the multiple downstream channels 30.

In one example, the wideband channels 30 are each modulated using Quadrature Amplitude Modulation (QAM). In one example, 64 QAM modulation with 16 downstream RF channels 30 provides approximately 480 Million bits per second (Mbps) of downstream bandwidth. Using 256 QAM modulation provides approximately 640 Mbps of downstream bandwidth. Each downstream RF channel 30 is associated with a Quadrature Amplitude Modulator (QAM) and Up-Converter (U) 48. The Q&U's 48 each modulate the MPEG digital data over a different RF channel.

The MAC interface 46 is also used for transmitting DOCSIS IP data over a single RF channel 30A and receiving DOCSIS IP data over upstream RF channel 32. A demodulator 50 demodulates upstream IP traffic received over upstream channel 32. The MAC 46 in the WCMTS 28 can use the same Q&U 48A for transmitting narrowband traffic, wideband traffic, or both narrowband and wideband traffic over downstream channel 30A.

Each WCM 34 includes a wideband tuner 54 that includes multiple Tuners (T) and QAM demodulators (D) 56. The T&Ds 56 demodulate the digital data from the downstream channels 30. A wideband Receive (Rx) framer 58 reassembles data received over the different RF channels 30 into the data stream originally sent by the server 26 (FIG. 2).

A decoder 60 includes a DOCSIS MAC/PHY interface for controlling how MPEG frames are reassembled into Ethernet frames and sent over the Ethernet link 36. The MAC/PHY interface is also used for sending IP data over upstream RF channel 32 to the MAC interface 46 in CMTS 14. The MAC interface 46 in the WCMTS 28 sends a Wideband Channel Descriptor (WCD) 55 to the WCMs 34 that indicate which RF channels 30 are part of the wideband channel 35.

Wideband Formatting

Figure 4:
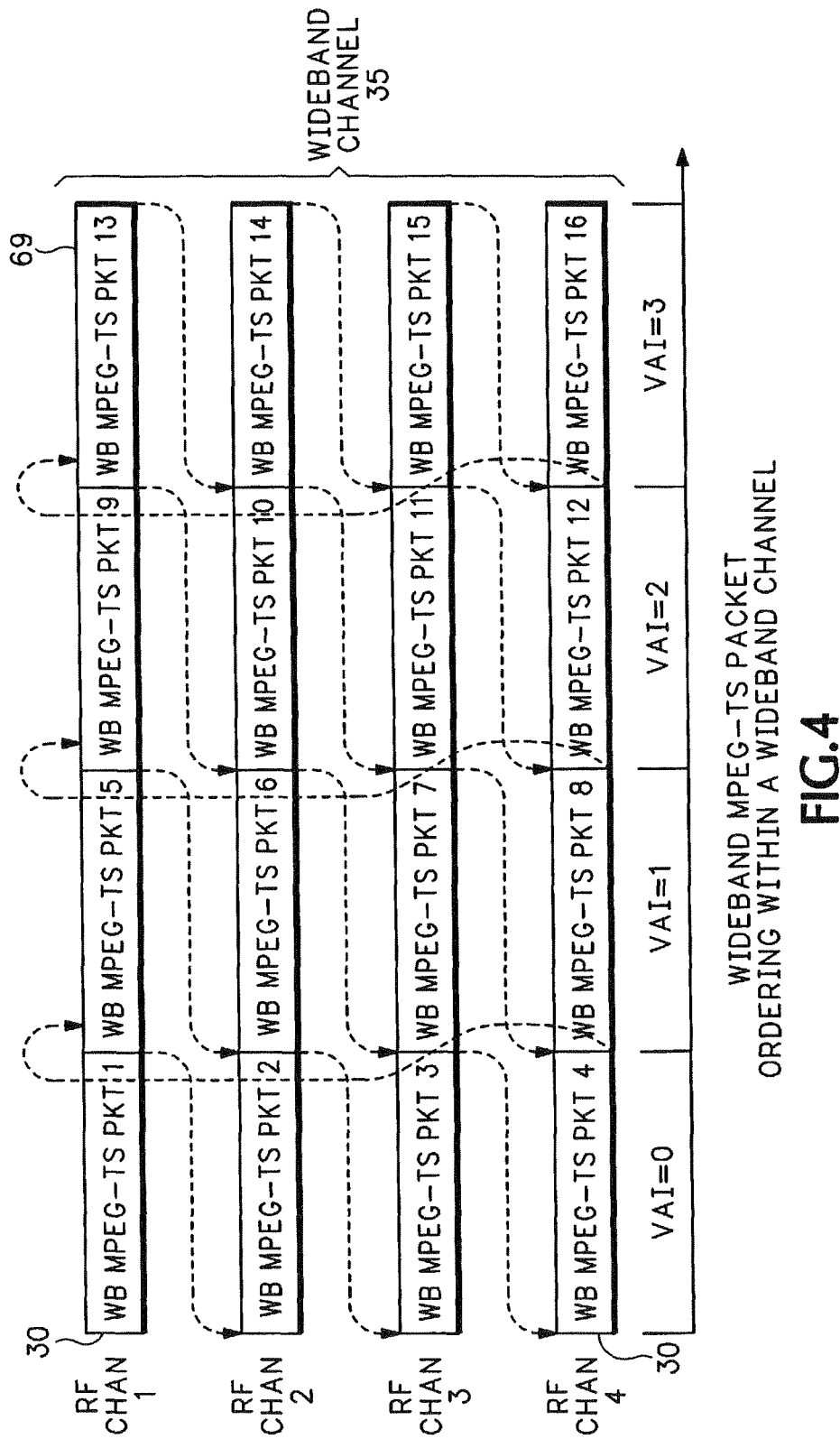
FIG. 4 shows MPEG packet ordering in a wideband channel.

FIG. 4 shows vertical striping of wideband MPEG-TS packets 69 in a 4-wide wideband channel 35. Wideband MPEG-TS packets 69 carry wideband DOCSIS data. Vertical Alignment Indexes (VAIs) increment across the horizontal MPEG-TS packets 69. The VAI values in a vertical group of wideband MPEG-TS packets are shown on the horizontal axis. For example, the wideband MPEG-TS packets 1-4 are assigned VAI values of 0.

The wideband channels are effectively independent of the layer-1 physical layer (PHY) and operates as a shim between the PHY layer and the layer-2 MAC layer. This allows the downstream bandwidth to be noncontiguous. The bandwidth assigned to a particular WCM can be distributed in different noncontiguous portions of the total available RF spectrum. In other words, any selectable combination of non-contiguous RF channels can be used for any wideband channel.

The VAIs indicate a time sequence for the wideband MPEG-TS packets 69 transmitted over the RF channels. The WCMs 34 use the VAIs to realign the wideband MPEG-TS packets 69 received from the WCMTS 28 over the different RF channels. A Radio Frequency (RF) table (FIG. 17) identifies the frequencies for the RF channels and the order that the identified RF channels should be decoded by the WCM 34.

Figure 17:
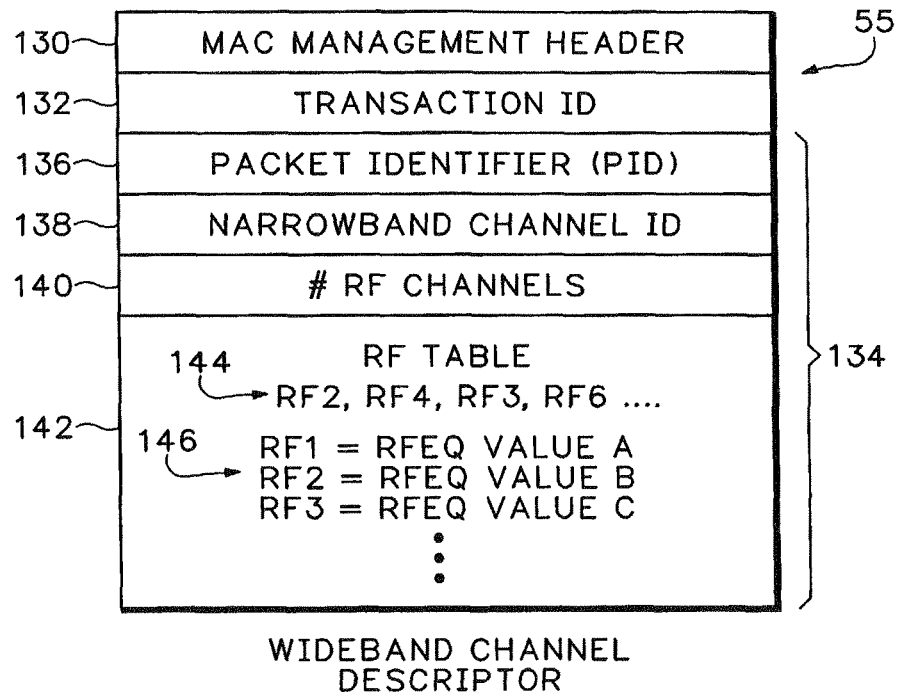
FIG. 17 shows a wideband channel descriptor.

The decoder 60 uses the VAI's to temporally align the wideband MPEG-TS packets 69 transmitted over the multiple RF channels. The decoder 60 then decodes particular RF channels in a particular channel sequence identified in the RF table (FIG. 17).

In the example shown in FIG. 4, the decoder 60 reads the wideband MPEG-TS packet 1 in RF channel 1 and then reads the wideband MPEG-TS packet 2 in RF channel 2. The decoder 60 combines other wideband packets 3, 4, 5, etc. from the RF channels in a similar manner. Different WCMs 34 could scan different RF channel frequencies and in different RF channel orders according to the sequence of frequencies contained in the RF table.

FIG. 5 shows the format of the wideband MPEG-TS packet 69 in more detail. The wideband packet 69 consists of a MPEG-TS header 70, a pointer_field 72 (may not be present in all wideband packets), a wideband header 74, and a DOCSIS payload 76. One example of fields contained in the standard MPEG-TS header 70 shown in Table 1.0.

A Packet Identifier (PID) exists in the current MPEG transport scheme. Particular PID values are used in a novel manner in one embodiment of the present invention to identify payloads associated with wideband channels. The wideband PID values are used along with the RF table by the WCMs 34 (FIG. 2) to decode wideband payloads that extend over multiple downstream channels.

A Continuity Counter (CC) is a preexisting field used in a conventional MPEG header. The CC is used in a novel manner in one embodiment of the present invention for tracking wideband MPEG-TS packets that extend over multiple RF channels.

The pointer_field 72 contains the number of bytes in the wideband packet 69 that immediately follow the pointer_field 72 that the framer 58 (FIG. 3) in the WCM 34 must skip before looking for the beginning of a DOCSIS MAC frame. The pointer_field 72 may point to the beginning of a DOCSIS MAC frame. Alternatively, the pointer_field 72 may point to any stuff byte preceding the DOCSIS MAC frame. The pointer_field was previously used in DOCSIS to identify consecutive MPEG-TS packets in a same RF channel. The wideband scheme according to one embodiment of the invention uses the pointer_field 72 to identify payloads that extend across multiple RF channels.

TABLE 1.0

MPEG-TS Header Format for Wideband MPEG-TS packets

| Field | Length (bits) | Description |
| --- | --- | --- |
| sync_byte | 8 | MPEG-TS packet Sync byte |
| transport_error_indicator | 1 | Indicates an error has occurred in the reception of the packet. This bit is reset to zero by the sender, and set to one by the receiver whenever an error occurs in transmission of the packet. |
| payload_unit_start_indicator (PUSI) | 1 | A value of one indicates the presence of a pointer_field as the fifth byte of the packet |
| transport_priority | 1 | Reserved; set to zero |
| PID | 13 | Wideband channel packet identifier: |

TABLE 1.0-continued

MPEG-TS Header Format for Wideband MPEG-TS packets

| Field | Length (bits) | Description |
|---|---|---|
| transport_scrambling_control | 2 | Reserved |
| adaptation_field_control | 2 | Use of the adaptation_field may not be allowed on wideband channel PIDs |
| continuity_counter (CC) | 4 | Cyclic counter within a wideband channel PID per RF channel |

Table 2.0 shows the wideband header 74 in more detail. The wideband header 74 contains reserved bits followed by the Vertical Alignment Index (VAI). The reserved field can be used to compensate for skew. For example, one of the RF channels may be substantially ahead of the other RF channels. The reserved field may be used to identify the same VAI for two sequential wideband MPEG-TS packets. The exact position of the wideband header 74 within a wideband MPEG-TS packet 69 can vary depending on whether or not the pointer_field 72 is present.

TABLE 2.0

| Field | Length (bits) | Description |
|---|---|---|
| Reserved | 2 | Reserved |
| Vertical Alignment Index | 6 | A cyclic counter generated by the WCMTS conveys the vertical alignment of wideband MPEG-TS packets on all associated RF channels. |

The DOCSIS payload 76 in wideband MPEG-TS packet 69 can carry DOCSIS MAC frames and can also carry stuff bytes. The WCMTS 28 can insert conventional MPEG-TS null packets or wideband MPEG-TS null packets in an inactive wideband channel. Unlike conventional MPEG-TS null packets, wideband MPEG-TS null packets can provide VAIs to the WCMs 34.

The DOCSIS MAC frames can begin anywhere within the payload 76 of the wideband MPEG-TS packet 69 and may span multiple wideband MPEG-TS packets. Several DOCSIS MAC frames may exist within a single wideband MPEG-TS packet.

FIG. 6 shows a Payload Unit Start Indicator (PUSI) bit in the MPEG-TS header 70 that indicates the presence or absence of the pointer_field 72 as the first byte of the MPEG-TS payload. The start of a DOCSIS MAC frame 78 in DOCSIS payload 76 is positioned immediately after the wideband header 74. In FIG. 6, the pointer_field 72 is 1, and the decoder 60 in the WCM 34 begins searching for a valid DOCSIS MAC sublayer Frame Control (FC) immediately following the wideband header 74.

FIG. 7 shows the case where a DOCSIS MAC frame 2 is preceded by the tail of a previous DOCSIS MAC frame 1 and possibly a sequence of stuff bytes 83. The pointer_field 72 identifies the first byte after the tail of frame 1 (which could be a stuff byte) as the position where the decoder 60 in the WCM 34 should begin searching for a DOCSIS MAC sublayer frame control value.

FIG. 8 shows multiple DOCSIS MAC frames 1, 2, and 3 contained within the same wideband MPEG-TS packet 69. The DOCSIS MAC frames may follow one after the other, or may be separated by an optional sequence of stuff bytes 83.

FIG. 9 shows the case where a DOCSIS MAC frame 1 spans multiple wideband MPEG-TS packets 69A, 69B and 69C. The wideband MPEG-TS packet 69C encapsulates the start of the next MAC frame 2. The pointer_field 72C for wideband packet 69C points to the byte following the last byte of the tail of MAC frame 1.

Wideband Dynamic Bandwidth Allocation

Figure 10:
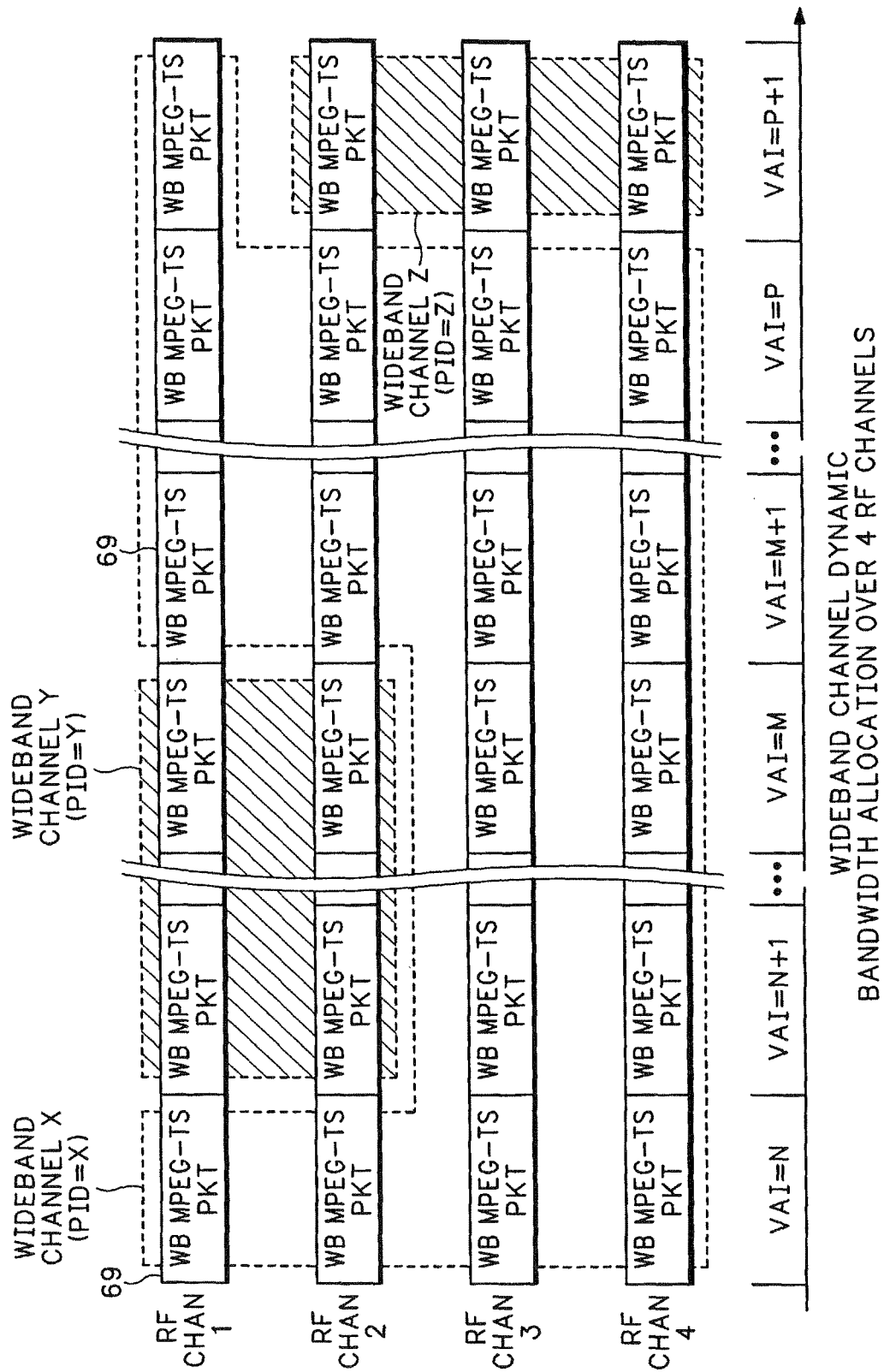
FIGS. 10 and 11 show how wideband channels are dynamically changed over different RF channels.

FIG. 10 shows how the bandwidth of the wideband channel can be dynamically adjusted by changing the number of RF channels. In one example, the wideband channel bandwidth is adjusted at wideband MPEG-TS packet boundaries. The WCMTS 28 (FIG. 3) can dynamically vary the bandwidth of multiple different wideband channels simply by varying the wideband configuration parameters in the RF table associated with different PIDs.

For example, FIG. 10 shows three wideband channels PID=X, Y, and Z mapped over four RF channels 1-4. The three wideband channels are configured using a RF channel frequency tables. The RF channel frequency table is part of the wideband channel descriptors that specify wideband channels as entering over RF channels 1-4. The channel frequency table is part of the wideband channel descriptor 55 shown in FIG. 17.

Pursuant to the RF frequency table, the WCM 34 finds the wideband data by monitoring all four RF channels 1-4 for wideband packets having certain PID values (See Table 1.0). The WCM 34 further filters the wideband channel data by, looking for MAC addresses in the Destination Address (DA) field of the Ethernet packets in the DOCSIS MAC frame payloads within the wideband channel.

FIG. 10 shows a wideband channel PID=X that uses the entire bandwidth of all four RF channels 1, 2, 3, and 4 when the wideband MPEG-TS packets 69 have Vertical Alignment Indexes (VAI) equal to N. For the next wideband MPEG-TS packets transported at VAI=N+1, RF channels 1 and 2 carry wideband channel PID=Y and RF channels 3 and 4 continue to carry wideband channel PID=X. The equal division of bandwidth between wideband channels X and Y continues until the wideband MPEG-TS packets have VAIs equal to M+1.

At VAI=M+1, wideband channel X again utilizes the entire bandwidth of all four RF channels. This RF channel utilization continues up to and including when the transported wideband MPEG-TS packets have VAIs equal to P. When the next wideband MPEG-TS packets are transported at VAI=P+1, RF channels 2-4 are used for wideband channel Z while RF channel 1 is used for wideband channel X.

The WCM decoder 60 reads the PID values in each wideband packet 69. Since all wideband packets for VAI=N have the same PID value, the WCM decoder 60 combines these packets together as part of the same wideband channel. At VAI=N+1, the wideband packets for RF channels 1 and 2 have PID=Y and the RF channels 3 and 4 have PID=X. The WCM decoder 60 by reading the PIDs knows to combine the MPEG frames, if appropriate, for wideband channel X in the RF channels 3 and 4 with other MPEG frames previously received in RF channels 1-4 for wideband channel X at VAI=1. The WCM decoder 60 similarly combines when appropriate the MPEG frames received in wideband channel Y over RF channels 1 and 2 for VAI=N+1 through VAI=M.

Figure 11:
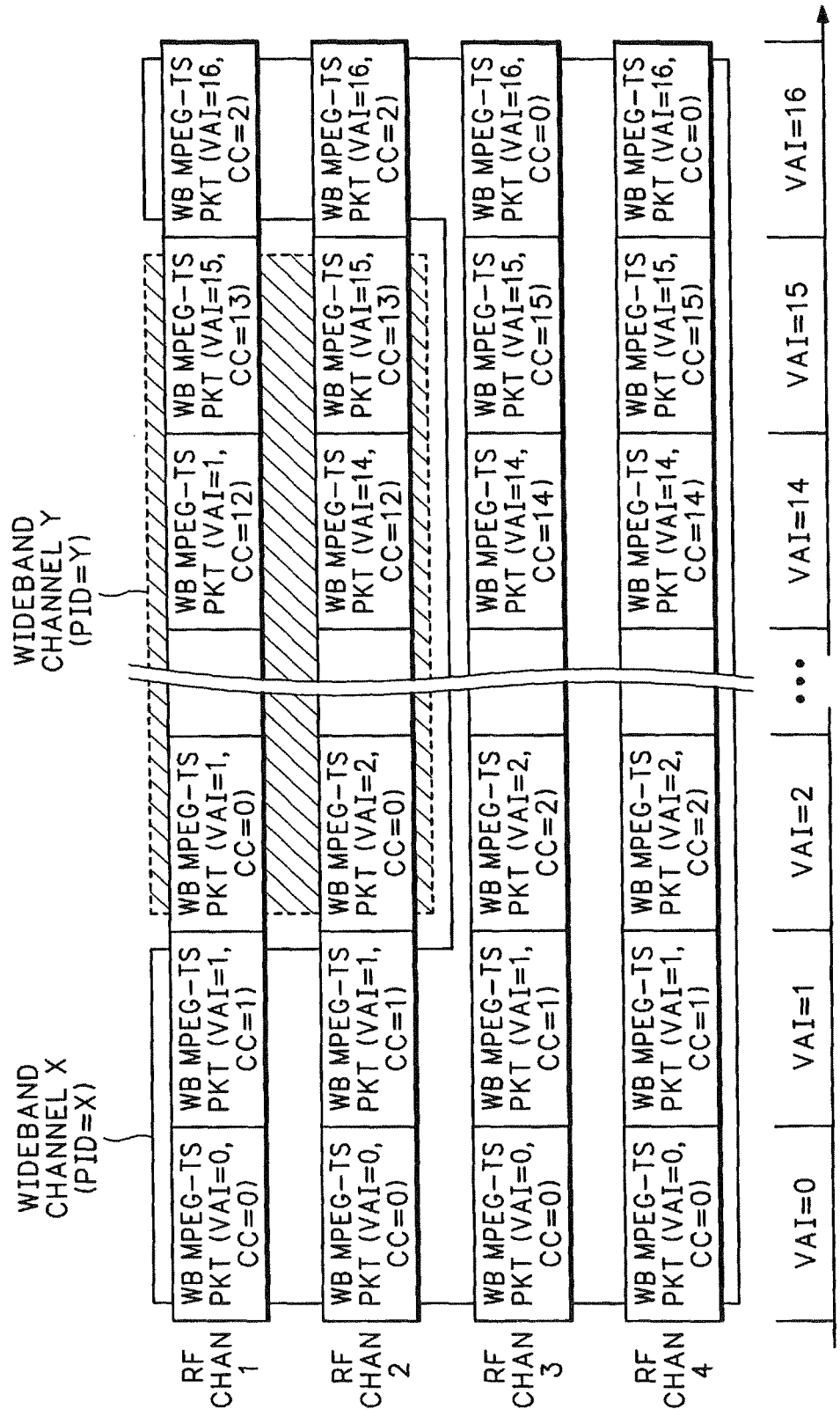

FIG. 11 shows how the Vertical Alignment Indexes (VAIs) operate in combination with Continuity Counters (CCs). The CC is a field incremented with each transport stream packet having the same Packet Identifier (PID). In one example, seventeen wideband MPEG-TS packet slots VAI=0 through VAI=16 are transmitted over each of four RF channels. Two wideband channels X and Y are mapped over the four RF channels 1, 2, 3 and 4.

The VAI values are used for aligning vertical groups of wideband MPEG-TS packets across all the RF channels. The CC values increment horizontally across RF channels according to the wideband channel. The CCs in wideband MPEG-TS packets are treated independently for each RF channel PID. This allows the WCM decoder 60 to determine which wideband packets in a sequence for a particular RF channel have been received, even when wideband packets for a particular wideband channel are not transmitted for certain VAI packet slots.

Figure 12:
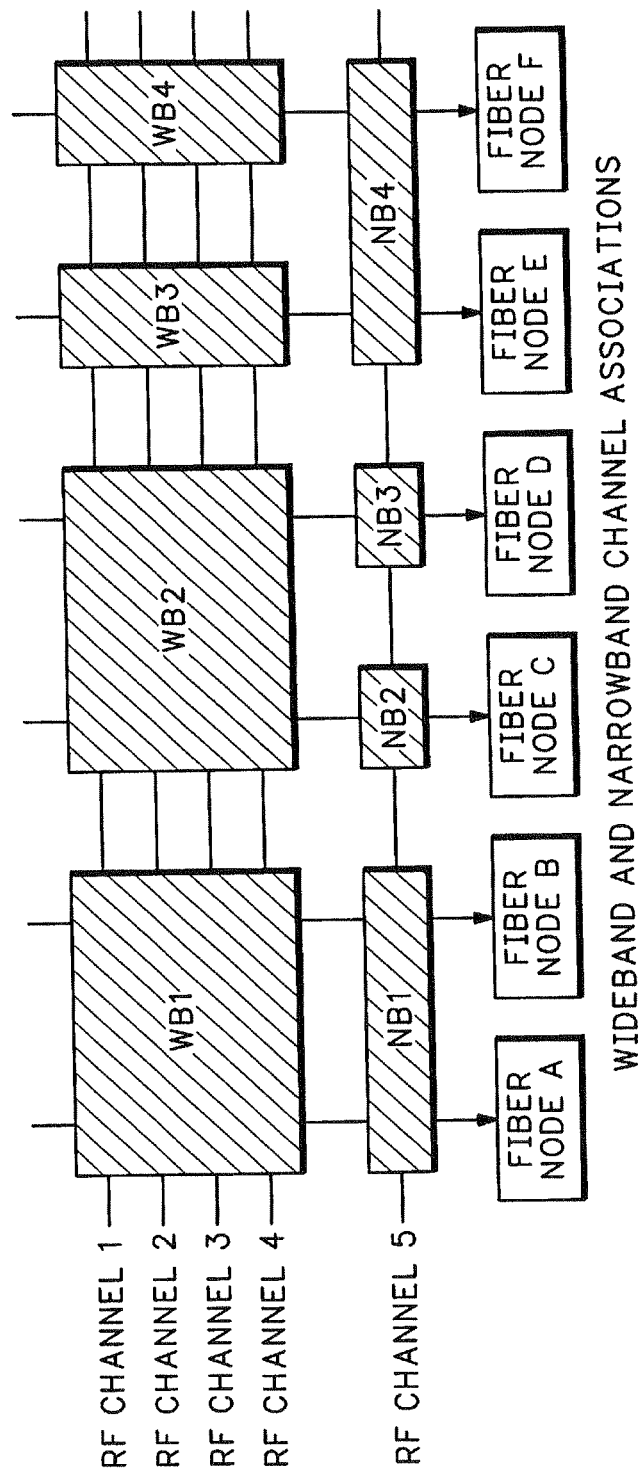
FIGS. 12-14 show how different wideband and narrowband channels are associated with different RF channels.

FIG. 12 shows six fiber nodes A-F, each with a separate forward carrier path. Each forward carrier path contains its own RF spectrum. The wideband channels WB1-WB4 are associated with the RF channels 1-4 and the narrow band channels NB1-NB4 are associated with RF channel 5. Fiber nodes A and 13 each share the same narrowband channel NB1 and wideband channel WB1. This results in a single association of WB1 to NB1. It should be understood that this is only one example, and any combination of any number of wideband and narrowband channels can be associated with any number and combination of RF channels.

Fiber nodes C and D share wideband channel WB2 and each have their own narrowband channels NB2 and NB3, respectively. This results in two separate associations of WB2 to NB2, and WB2 to NB3. Fiber nodes E and F share the same narrowband channel NB4, but have different wideband channels WB3 and WB4, respectively. This results in two separate associations of WB3 to NB4 and WB4 to NB4. In one embodiment, there is one PID associated with each wideband channel. The wideband channel descriptors associated with a particular PID then identify to the WCMs of the RF channels and sequence associated with the wideband channels and narrowband channels.

The wideband channel descriptor 55 (FIG. 3) is sent by the WCMTS 28 over the narrowband channel 30A. The WCD 55 contains channel descriptors that identify the RF channel frequencies, sequence, and PIDs for the wideband channels associated with each fiber node A-F. Each unique association of wideband channel to narrowband channel may have its own wideband channel descriptor.

Interleaving Wideband and Narrowband Channels

Figure 13:
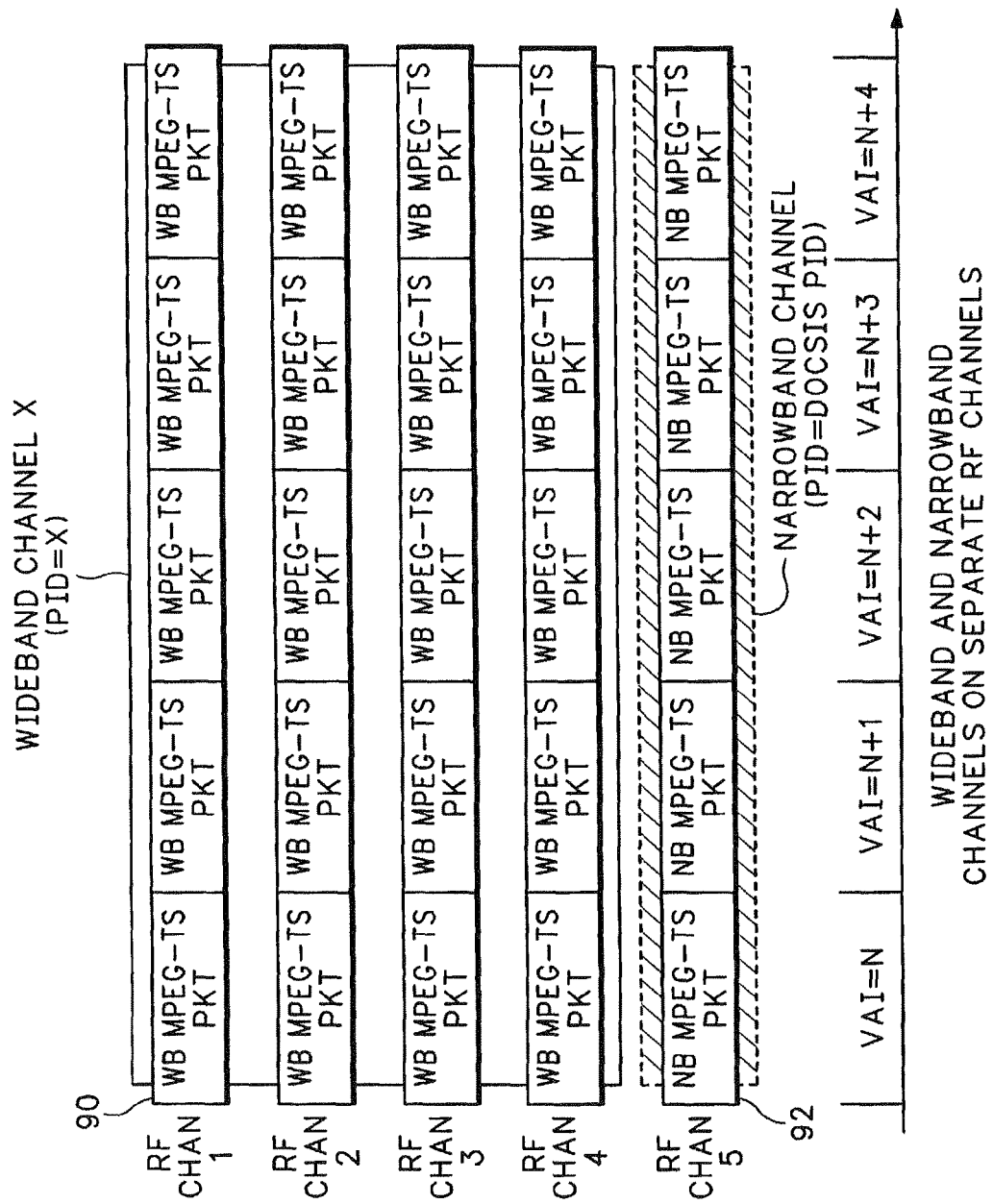
Figure 14:
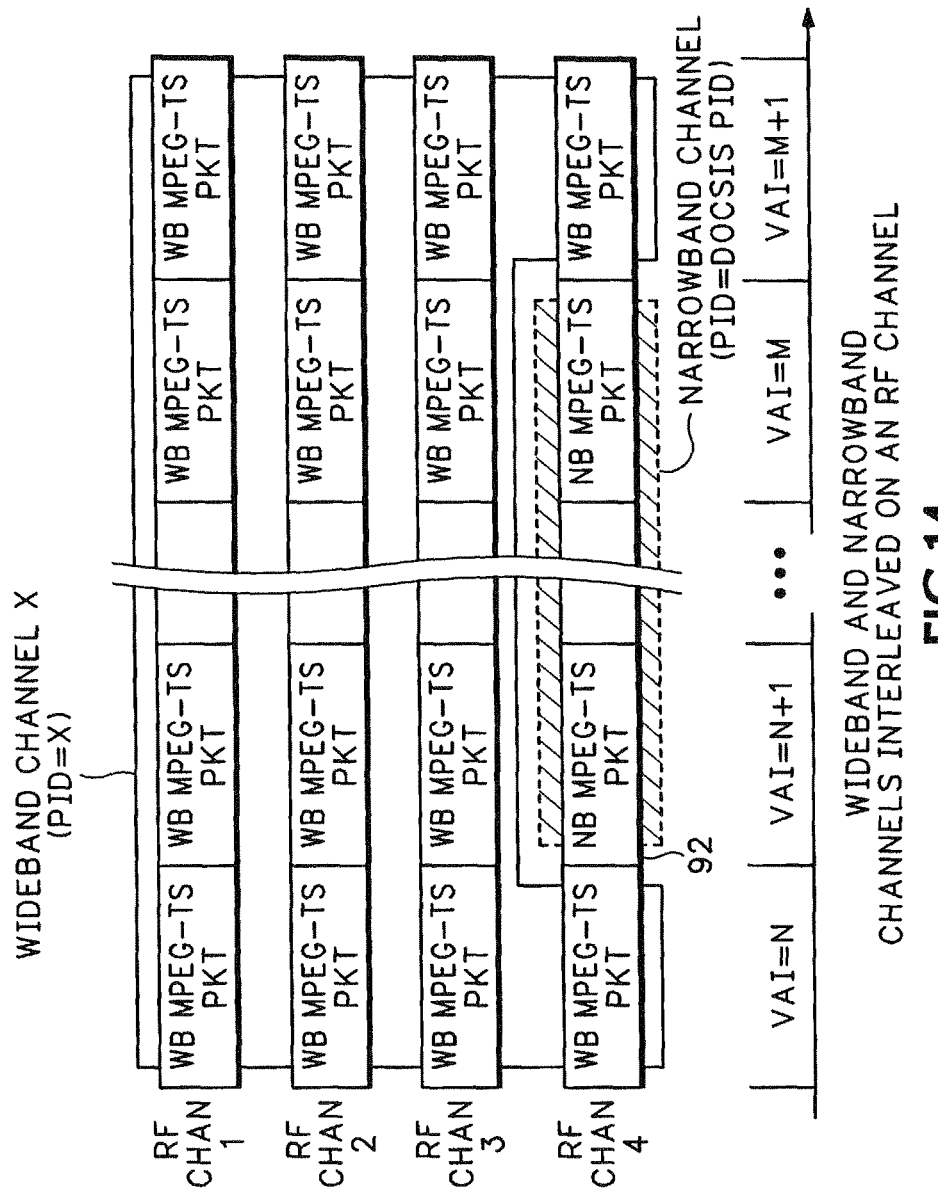

Narrowband and wideband cable modems can receive narrowband MPEG-TS packets over either an RF channel dedicated to a narrowband channel, or an RF channel where wideband and narrowband channels are interleaved. FIGS. 13 and 14 illustrate two different scenarios.

FIG. 13 shows five RF channels 1-5. RF channels 1-4 carry wideband MPEG-TS packets 90 for wideband channel X. The RF channel 5 carries narrowband MPEG-TS packets 92 in a narrowband channel (PID=DOCSIS PID). The wideband packets 90 from RF channels 1-4 are combined together by the WCM 34 to generate a single wideband data stream. The narrowband packets 92 from RF channel 5 are combined together to generated a single narrowband data stream.

FIG. 14 shows another interleaving configuration where RF channels 1-4 carry both wideband and narrowband channels. The wideband channel X extends over different combinations of all four RF channels 1-4 and the narrowband channel (PID=DOCSIS PID) is interleaved with the wideband channel X on RF channel 4.

The bandwidth of wideband channel X can be dynamically adjusted to allow the narrowband channel 92 to share the bandwidth of RF channel 4 during the packet slots from VAI=N+1 through VAI=M. The WCMs 34 (FIG. 3) are configured using the WCD 55 (FIG. 17) to receive wideband channel X over RF channels 1-4. The WCM decoder 60 identifies the narrowband packet 92 at VAI=N+1 by detecting PID=DOCSIS PID in the MPEG-TS header. The WCM decoder 60 processes the narrowband packet 92 as a conventional single band DOCSIS MPEG-TS packet by combining packet 92 with other narrowband packets identified (PID=DOCSIS PID) on RF channel 4.

Figure 15:
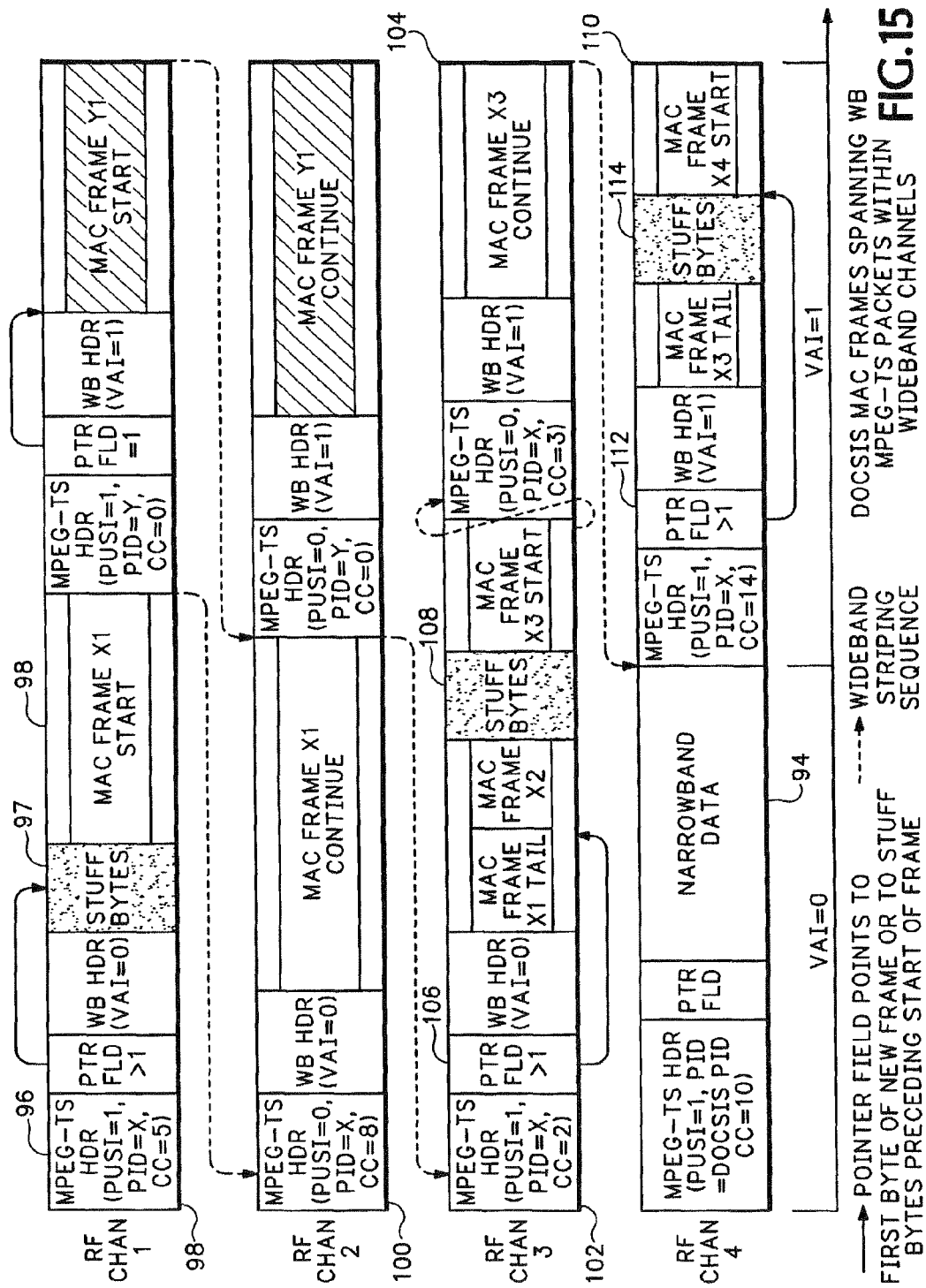
FIG. 15 shows how DOCSIS MAC frames can span wideband packets.

FIG. 15 is an example showing how DOCSIS MAC frames span multiple wideband MPEG-TS packets 98 even when the wideband channel bandwidth dynamically changes. In this example, two wideband channels PID=X and PID=Y and a narrowband channel 94 are interleaved across four RF channels 1-4. The wideband channel descriptor in FIG. 17 identifies the RF channels 1-4 associated with wideband channels X and Y.

The first three wideband MPEG-TS packets transmitted on RF channels 1-3 have VAI=0 and PID=X. The RF channel 4 at VAI=0 has a PID=DOCSIS PID. At VAI=1, RF channels 1 and 2 have PID=Y. The wideband MPEG-TS packets for RF channels 3 and 4 at VAI=1 have PID=X. Narrowband MPEG-TS packets do not contain a VAI field. The values of the Continuity Counters (CCs) in the first four vertical MPEG-TS packets are arbitrarily chosen to illustrate the independence of CCs between RF channels.

The decoders 60 in the WCMs 34 conduct the following wideband striping sequence according to the above VAI and PID values. The DOCSIS MAC frame X1 begins inside the wideband MPEG-TS packet 98 with VAI=0 on RF channel 1. The PID value of X in the MPEG-TS header 96 identifies the wideband MPEG-TS packet 98 as part of wideband channel X. The wideband MPEG-TS packet 98 has a Payload Unit Start Indicator (PUSI) bit in the MPEG-TS header 96 set to 1, indicating that the pointer_field is present. The pointer_field points to one of the stuff bytes 97 preceding the beginning of DOCSIS MAC frame X1.

The DOCSIS MAC frame X1 continues in the wideband MPEG-TS packet 100 on RF channel 2 at VAI=0. The entire payload of the wideband MPEG-TS packet 100 contains the continuation of DOCSIS MAC frame X1 from RF channel 1. The PUSI bit is accordingly set to 0 and there is no pointer_field. In one embodiment, stuff bytes are only inserted between DOCSIS MAC frames, therefore no stuff bytes exist in wideband MPEG-TS packet 100.

The DOCSIS MAC frame X1 ends on the wideband MPEG-TS packet 102 on RF channel 3 at VAI=0. The DOCSIS MAC frame X1 is immediately followed by DOCSIS MAC frame X2. The DOCSIS MAC frame X2 is a small frame totally contained in wideband MPEG-TS packet 102. The pointer_field 106 is used in wideband packet 102 to point to the beginning of new DOCSIS MAC frame X2. The DOCSIS MAC frame X2 is followed by optional stuff bytes 108 and the beginning of DOCSIS MAC frame X3. Although wideband MPEG-TS packet 102 contains the beginning of two DOCSIS MAC frames X2 and X3, the pointer_field points to the first new MAC frame X2.

The narrowband MPEG-TS packet on RF channel 4 and the wideband MPEG-TS packets with VAI=1 on RF channels 1 and 2 do not have a PID value of X. The DOCSIS MAC frame X3 accordingly is continued on the next wideband MPEG-TS packet 104 with VAI=1 and PID=X on RF channel 3. The DOCSIS MAC frame X3 ends in the wideband MPEG-TS packet 110 on RF channel 4 having VAI=1. The DOCSIS MAC frame X3 in wideband packet 110 is followed by a number of stuff bytes 114 and the start of DOCSIS MAC frame X4. The pointer_field 112 in wideband MPEG-TS packet 110 points to the beginning of DOCSIS MAC frame X4. Alternatively, the pointer_field 112 could point to any of the preceding stuff bytes 114.

MPEG Over MPEG Byte Striping

Figure 16:
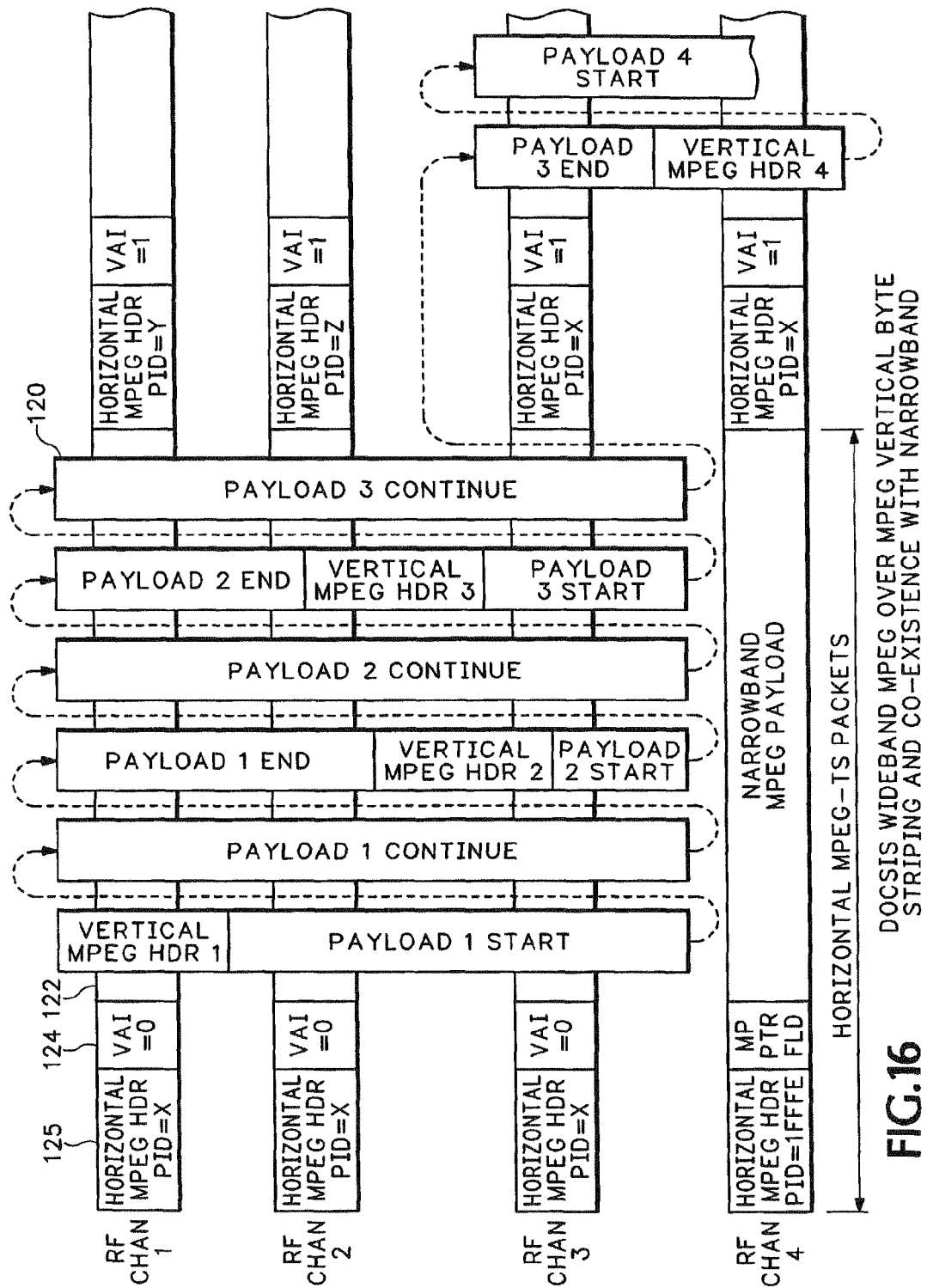
FIG. 16 shows one example of how bytes are striped over multiple RF channels.

FIG. 16 shows one alternative embodiment referred to as vertical byte striping. Referring to FIGS. 3 and 16, a wideband transport channel 120 is created by vertically byte-striping MPEG-TS packets over multiple horizontal MPEG-TS streams. At the physical layer, each RF channel 1-4 runs independently as a separate MPEG-TS stream. At the link layer, the wideband transmitter 44 aligns the various RF channels 1-4 that make up a wideband transport sub-channel by selecting values in the PID field in MPEG-TS header 125. The wideband decoder 60 in FIG. 3 corrects for jitter in the RE channels 1-4 between the wideband transmitter 44 and wideband receiver 58 using the VAI values 124 to realign the horizontal MPEG-TS streams. The receiving WCMs 34 recreate the original MPEG-TS stream by de-striping the vertical MPEG-TS stream from the horizontal MPEG-TS streams.

The wideband channel 120 can be run as a single fat wideband transport sub-channel, sub-divided into several smaller wideband transport sub-channels, or run as a mixture of wideband transport sub-channels and narrowband channels. In FIG. 16, during the first horizontal MPEG-TS packet time, RF channels 1, 2 and 3 are run as a 3-wide wideband transport channel, while RF channel 4 is run as a narrowband channel.

The PID field in the MPEG packet header 125 indicates which RF channels are being used to stripe the wideband data for a given wideband transport sub-channel. The PID is set to the value of X for the wideband transport sub-channel. The PID value X can be any value except reserved values (e.g. 0x1FFFE). In this example, the WCMTS 28 knows that there is a 4-channel wide wideband receiver 58 listening on the four RE channels 1-4.

The WCMTS 28 may decide that it needs to use three of the four RF channels to keep up with Quality of Service (QoS) bandwidth requirements. Accordingly, the WCMTS 28 transmits with the PID set to X over RF channels 1, 2, and 3. During the next MPEG-TS packet time, the WCMTS 28 may decide that it only needs two RF channels worth of bandwidth and transmits with a PID set to X only over RF channels 3 and 4.

The WCM 34 looks on the four RF channels 1-4 for wideband channels with a PID=X and de-stripes the wideband data from all MPEG-TS packets having a PID=X. If another wideband channel PID value is detected, the WCM 34 combines that wideband packet with other wideband packets having a similar PID value.

This dynamic channel assignment allows the WCMTS 28 to balance the load between all the subscribers by simply choosing which and how many RF channels to stripe the wideband transport sub-channel for any given time slot. The WCMTS 28 does not need to notify the WCM a priori, as the PID information is sent in-band and is sufficient for the WCM 34 to adjust the received channels dynamically to keep up with the WCMTS transmission.

Wideband Channel Descriptor (WCD)

Figure 18:
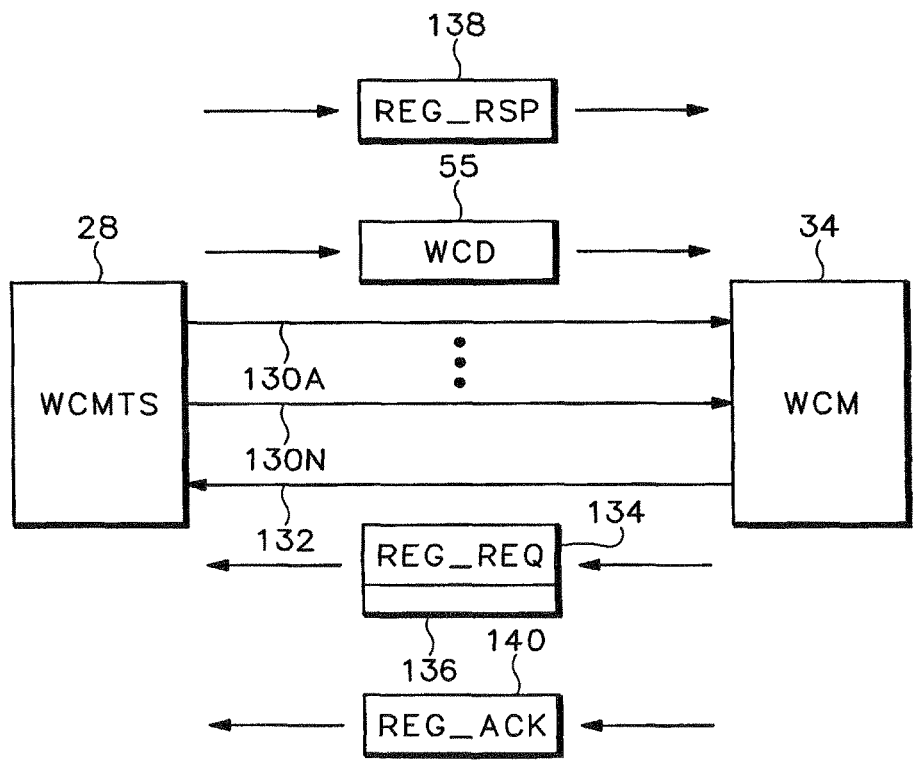
FIG. 18 is a block diagram showing how the wideband cable system is configured.

FIGS. 17 and 18 show how a Wideband Channel Descriptor (WCD) 55 is transmitted by a wideband capable CMTS 28 at periodic intervals to define the characteristics of a logical wideband downstream channel. A separate message may be transmitted for each logical wideband downstream channel that is currently available for use. The CMTS 28 generates WCDs 55 that contain the information shown in FIG. 17.

A configuration change count is incremented by one by the CMTS 28 whenever any of the values of the channel descriptors in WCD 55 change. If the value of the count in a subsequent WCD 55 remains the same, the WCMs 34 can quickly decide that the channel operating parameters have not changed, and may be able to disregard the remainder of the message.

The WCD 55 includes a MAC management header 130, a transaction ID 132 and TLVs 134 containing wideband configuration data 134 that specifies how PID 136 is used in the wideband packet header to identify the wideband channel. The TLVs 134 specifies in field 140 the number of physical RF channels used to carry the wideband channel and identifies in field 138 narrowband downstream channels associated with the wideband channel.

The TLVs 134 can include the RF table 142 that contains a sequence number 144 indicating what order the RF channel payloads are decoded by the WCMs. Center frequencies 146 indicate the frequencies for each RF channel used in the wideband channel. The RF channels may be sequenced in any order and may or may not be adjacent in frequency to each other.

The WCMTS 28 and WCM 34 can support data link encryption within the wideband channels. The WCMTS 28 may or may not use the same encryption and keying for the WCM 34 used on the associated narrowband channel. The cable modems can accept the same keying on both the narrowband channel and with wideband channel, or can accept separate keying for wideband and narrowband channels.

Wideband Channel Acquisition

FIG. 18 shows how the WCM 34 acquires a logical wideband channel. The WCM 34 first acquires a DOCSIS narrowband channel 130A and completes ranging making an upstream channel 132 operational. The WCMTS 28 assigns a PID value to the WCM 34 and downloads the WCD 55 containing the wideband channel parameters including the frequency table 142 to the WCM 34.

The WCM 34 reads the wideband channel descriptors 55 having the assigned PID 136 (FIG. 17). The WCM 34 issues a REG-REQ 134 to the WCMTS 28 along with any WCD wideband capabilities parameters 136. After the WCM 34 receives an REG-RSP 138 back from the WCMTS 28, all downstream RF channels 130A-130N are acquired that are identified as comprising the wideband channel. A REG-ACK 140 is sent from the WCM 34 back to the WCMTS 28. The WCM 34 then starts receiving data on the assigned wideband PID.

The WCMTS 28 can periodically reassign different wideband perimeters to one or more of the wideband cable modems 34. For example, the WCMTS 28 may send a wideband channel descriptor 55 to a WCM 34 lists a first set of RF channels in a first sequence for the WCM's wideband channel. Some time later, the WCMTS 28 may send another wideband channel descriptor 55 having the same associated PID value but that contains a different set of RF channels to be used as wideband or narrowband channels or that lists the same set of RF channels in a different order.

The WCMTS 28 can use the wideband channel descriptors 55 to dynamically send different wideband configuration data to particular WCMs 34 based on changing bandwidth requirements. For example, at different times there can be different wideband and narrowband payload demands. The WCMTS 28 uses the wideband channel descriptor 55 to dynamically reassign the RF channels to different wideband and narrowband channels according to these changing bandwidth demands.

The dynamic assignment of RF channels can also be used to increase system reliability. For example, the WCMTS or WCM may identify faults in one or more RF channels. The WCMTS can then send a wideband channel descriptor 55 containing a new RF table to the WCMs using the RF channels identified with faults. The new RF table dynamically drops the identified RF channels from the wideband or narrowband channels.

A CM without wideband capabilities may not recognize any of the new wideband-specific TLVs 134 in the WCD 55. The CM may be unable to register successfully if provisioned with the WCD 55 that contains wideband-specific parameters. When interoperating with a CM that does not have wideband-specific capabilities, the WCMTS 28 would allow a CM to register and operate as a CM. When WCM 34 registers with the WCMTS 28, the WCMTS 28 may return the REG-RESP message 138 that configures the WCM 34 in a mode with or without wideband-specific capabilities.

When interoperating with a WCMTS 28, a CM without wideband-specific capabilities receives data on a single RF channel 130A. When interoperating with a CMTS without wideband-specific capabilities, a WCM 34 receives data on a single RF channel 130A.

Packet Skew

Wideband MPEG-TS packet skew is defined to be the maximum expected skew from the arrival of the first MPEG-TS packet with a given VAI to the arrival of the last MPEG-TS packet with the same VAI within a given wideband channel. The skew is measured at the WCM receiver MAC interface to the PHY.

The MPEG-TS packets that make up a wideband channel are de-skewed using the VAI in the wideband MPEG header 74 (FIGS. 6-9). The MPEG-TS packets with PID values other than those defined to be wideband PIDs, including narrowband packets (PID=DOCSIS PID) and MPEG-TS nulls, will not contain valid VAIs. If the WCM 34 does not receive an MPEG-TS packet for a given VAI within the specified maximum skew window for any given RF channel of the wideband channel, the WCM 34 concludes no wideband MPEG-TS packet was sent on that RF channel for the given VAI.

Alternatively, the next consecutive CC for that PID may be received in another VAI packet slot. The WCM 34 may then conclude that no wideband packet for that PID was sent in the previous VAI packet slot.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. An apparatus, comprising:
 a wideband cable modem configured to receive and decode a logical wideband channel received over a plurality of downstream Quadrature Amplitude Modulation (QAM) channels, wherein the logical wideband channel spans across a first combination of some of the downstream QAM channels at a first time and a second different combination of some of the downstream QAM channels at a second later time; and
 the wideband cable modem configured to monitor all the downstream QAM channels for packets having a particular packet identifier value that correlates said packets to the logical wideband channel, to track dynamic utilization of the downstream QAM channels by the logical wideband channel over the first and second times according to the monitoring;
 wherein the correlated packets include Vertical Alignment Indexes (VAIs) to identify temporal positions of said packets in the plurality of downstream QAM channels, and wherein the wideband cable modem is configured to use the VAIs to temporally realign the packets received over the first combination and the second different combination of the downstream QAM channels.

2. The apparatus of claim 1, wherein the wideband cable modem is configured to inspect Moving Picture Experts Group (MPEG) Packet IDentifier (PID) fields for the particular packet identifier value to distinguish the packets of the logical wideband channel from other packets received over the downstream QAM channels.

3. The apparatus of claim 1, wherein ones of the packets associated with a first transmit time have a same VAI value that is different than a VAI value of those ones of the packets associated with a second different transmit time.

4. The apparatus of claim 1, wherein the wideband cable modem includes a plurality of tuners having demodulators each configured to demodulate a different one of the downstream QAM channels.

5. The apparatus of claim 1, wherein the wideband cable modem is configured to identify the downstream QAM channels according to a received wideband channel descriptor.

6. The apparatus of claim 1, wherein the wideband cable modem is configured to use the same QAM channels for decoding both the logical wideband channel and a narrowband channel.

7. The apparatus of claim 1, wherein the received packets have an MPEG header, a wideband header and a Data Over Cable Service Interface Specification (DOCSIS) payload that contains Media Access Control (MAC) frames.

8. The apparatus of claim 1, wherein the wideband cable modem is configured to inspect continuity values to the packets that identify an order that the packets are transmitted over the first combination and the second different combination of the downstream QAM channels.

9. A method, comprising:
 receiving and decoding a logical wideband channel received over a plurality of downstream Quadrature Amplitude Modulation (QAM) channels, wherein the logical wideband channel spans across a first combination of some of the downstream QAM channels at a first time and a second different combination of some of the downstream QAM channels at a second later time; and
 monitoring all the downstream QAM channels for packets having a particular packet identifier value that correlates said packets to the logical wideband channel, to track dynamic utilization of the downstream QAM channels by the logical wideband channel over the first and second times according to the monitoring;
 wherein the correlated packets include Vertical Alignment Indexes (VAIs) to identify temporal positions of said packets in the plurality of downstream QAM channels, and wherein the method further comprises using the VAIs to temporally realign the packets received over the first combination and the second different combination of the downstream QAM channels.

10. The method of claim 9, further comprising inspecting Moving Picture Experts Group (MPEG) Packet IDentifier (PID) fields for the particular packet identifier value to distinguish the packets of the logical wideband channel from other packets received over the downstream QAM channels.

11. The method of claim 9, wherein ones of the packets associated with a first transmit time have a same VAI value that is different than a VAI value of those ones of the packets associated with a second different transmit time.

12. The method of claim 9, further comprising demodulating the downstream QAM channels using a plurality of tuners.

13. The method of claim 9, further comprising identifying the downstream QAM channels according to a received wideband channel descriptor.

14. The method of claim 9, further comprising using the same downstream QAM channels for decoding both the logical wideband channel and a narrowband channel.

15. The method of claim 9, wherein the received packets have an MPEG header, a wideband header and a Data Over Cable Service Interface Specification (DOCSIS) payload that contains Media Access Control (MAC) frames.

16. The method of claim 9, further comprising inspecting continuity values to the packets that identify an order that the packets are transmitted over the different downstream QAM channels.

17. An article of manufacture including a non-transitory computer-readable medium having instructions stored thereon that, in response to execution by a computing device, cause the computing device to perform operations comprising:

receiving and decoding a logical wideband channel received over a plurality of downstream Quadrature Amplitude Modulation (QAM) channels, wherein the logical wideband channel spans across a first combination of some of the downstream QAM channels at a first time and a second different combination of some of the downstream QAM channels at a second later time; and monitoring all the downstream QAM channels for packets having a particular packet identifier value that correlates said packets to the logical wideband channel, to track dynamic utilization of the downstream QAM channels by the logical wideband channel over the first and second times according to the monitoring;

wherein the correlated packets include Vertical Alignment Indexes (VAIs) to identify temporal positions of said packets in the plurality of downstream QAM channels, and wherein the operations further comprise using the VAIs to temporally realign the packets received over the first combination and the second different combination of the downstream QAM channels.

18. The article of manufacture of claim 17, wherein the operations include inspecting Moving Picture Experts Group (MPEG) Packet IDentifier (PID) fields for the particular packet identifier value to distinguish the packets of the logical wideband channel from other packets received over the downstream QAM channels.

19. The article of manufacture of claim 17, wherein the operations include demodulating the downstream QAM channels using a plurality of tuners.

20. The article of manufacture of claim 17, wherein the operations include inspecting continuity values to the packets that identify an order that the packets are transmitted over the different downstream QAM channels.

* * * * *